Patented Apr. 18, 1933

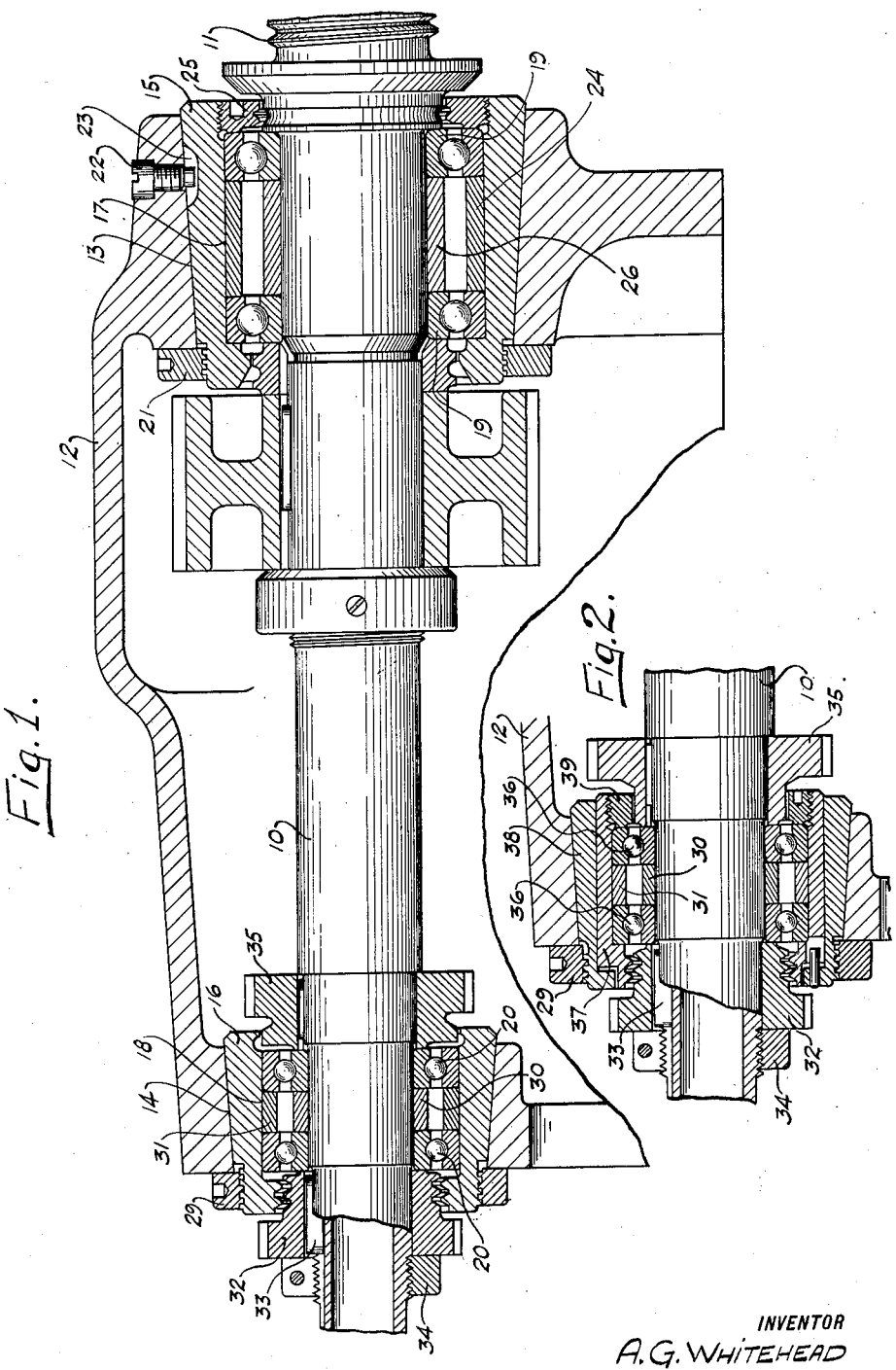

1,904,395

UNITED STATES PATENT OFFICE

ALEXANDER G. WHITEHEAD, OF HARTFORD, CONNECTICUT, ASSIGNOR TO PRATT & WHITNEY COMPANY, OF NEW YORK, N. Y., A CORPORATION OF NEW JERSEY

SPINDLE BEARING

Application filed September 17, 1930. Serial No. 482,536.

This invention relates to machine tool spindles and particularly to bearings therefor adapting the spindle to be rotated on a fixed axis with a minimum of friction and free movement.

A primary object of the invention is to provide a supporting bearing for a tool spindle in which anti-friction bearings are employed, the bearings being disposed within a housing member having a conical outside surface so that the axis of the bearing may be slightly adjusted by scraping or resurfacing the conical opening within the supporting and mounting member for the spindle.

Another object of the invention is to provide spaced bearings supporting a machine spindle, one bearing assembly being mounted and connected to the spindle so that the spindle is held against axial movement and the other bearing assembly is adapted for slidable adjustment axially within the support mounting the spindle, both of the bearings being of the anti-friction type.

With the above and other objects in view, my invention includes the features of construction and operation set forth in the following specification and illustrated in the accompanying drawing.

In the accompanying drawing annexed hereto and forming a part of this specification, I have shown my invention embodied in a work supporting and rotating spindle for the headstock of a lathe, but it will be understood that the invention can be otherwise embodied and that the drawing is not to be construed as defining or limiting the scope of the invention, the claims appended to this specification being relied upon for that purpose.

In the drawing:

Figure 1 is a front vertical sectional view taken through the axis of a tool spindle showing the bearing assemblies embodying the present invention mounted thereon; and Fig. 2 is a similar view of a modification showing a part only of a spindle and one of the bearings mounted thereon.

In the above mentioned drawing I have shown but one embodiment of the invention which is now deemed preferable, but it is to be understood that changes and modifications may be made within the scope of the appended claims without departing from the spirit of the invention.

In the construction of machine tools it is essential that the work or tool supporting spindles be so mounted that they will rotate freely, without vibration and upon a fixed axis. Most of all there must be no lost motion within the bearings so that the spindle will always rotate accurately upon the same axis. In addition the axis of the spindle must be precisely parallel to or at some other definite angle relative to guideways usually on the base upon which the support carrying the spindle is mounted. To effect the alignment of the spindle relative to other parts of the machine tool requires careful fitting of the bearing surfaces of the spindle. To simplify this fitting operation, which is usually accomplished by scraping surfaces to accurate position, the members enclosing the bearings are made conical. The surface of the support engaging these members is also conical. In setting up and assembling the machine tool, the conical recess within the support may be, after being machined to approximate dimension, scraped carefully to fit the enclosing members accurately. Supplemental scraping upon one side or the other of this conical bearing will slightly vary the axis of the spindle to position it in accordance with other guideways or spindles of the machine. The spindle previously may be completely assembled with its bearings and their enclosing members in position.

Referring more in detail to the figures of the drawing, I provide a spindle 10, such as the work supporting and rotating spindle of a machine tool, with spaced bearing assemblies, one of which is adjacent the work supporting end 11 of the spindle 10 and the other bearing is adjacent the opposite end of the spindle.

Referring first to the separated bearings on the spindle 10, generally I provide one end of the support 12 for the spindle, which in the illustrated embodiment is a headstock, with a conical hole 13 of relatively large diameter compared to the diameter of the spindle 10. At the opposite end of the headstock or other support 12 for the spindle 10 is a conical hole 14. Both of these holes 13 and 14 are adapted to receive housing members 15 and 16, respectively, enclosing bearings for the spindle. The outside surfaces of these housing members 15 and 16 closely fit the conical surfaces 13 and 14 and have internal cylindrical surfaces 17 and 18 formed to closely contact respectively with the outside races of anti-friction bearings 19 and 20.

The conical housing member 15 is adapted to be drawn tightly into position within the supporting headstock 12 by threads upon the smaller end thereof. A collar 21 engages the threads, tightening of which forces the conical member 15 further into the supporting headstock 12. A set screw 22 within the supporting headstock 12 and having a projection on its inner end engages a recess 23 formed within the conical member 15 and maintains this member 15 against rotation within the supporting headstock 12. Adapted to be received within this conical member 15 are the two spaced anti-friction bearings 19, the inner one of which has its outer race in engagement with an internal abutment adjacent one end of the conical housing member 15. Disposed between the outer races of the anti-friction members 19 is a spacer member 24. To retain the bearings in position within the supporting member 12 a ring 25 is threaded into the outer end of the conical member 15 and is adapted to bear directly against the face of the outer race of the outer bearing 19. With the bearings 19 thus held they are maintained against axial movement within the support 12.

The inner races of the spaced anti-friction bearings 19 are adapted to be pressed firmly upon a cylindrical portion of the spindle 10 and are held in proper spaced relation to each other by a spacing sleeve 26 surrounding the spindle 10 and engaging the contiguous walls of the anti-friction bearings 19.

At the opposite end of the spindle 10 a generally similar anti-friction bearing is provided, the size, however, being somewhat reduced as the diameter of the spindle at this end is of smaller diameter. The conical member 16 is held within its conical opening or hole 14 within the supporting member 12 by means of a nut 29 threaded upon screw threads on one end. Within this member 16 are the spaced anti-friction bearings 20 having inner races suitably spaced apart by an interposed spacing member 30 and adapted to closely engage the surface of the spindle 10. The outer races of these bearings 20 are adapted to slide easily within a cylindrical opening 18 formed within the conical member 16, the outer races being held properly spaced apart by a spacing ring 31. In order to hold the bearings 20 in position upon the spindle 10, a sleeve 32 extends over one end of the spindle 10, a key 33 being employed to prevent rotation of this member 32 relative to the spindle so that the sleeve may be used as a driving member. A nut 34 on the outer end of this sleeve 32 forces the sleeve 32 over the spindle 10 to hold the bearings 20 and their spacing member 30 tightly against a member 35 shown in the form of a gear, which in turn is held against a shoulder on the spindle 10. With this type of bearing, it will be seen that the conical bearing member 16 is utilized only to retain the anti-friction bearings 20 in their axial position, these bearings 20 being free to adjust themselves axially in accordance with the length of the spindle 10.

In Fig. 2 a modified form of the invention is shown in which spaced anti-friction bearings 36 are held within a sleeve member 37, the outer races of these bearings tightly engaging the internal cylindrical surface and being held in position within the sleeve 37 by a threaded nut 38 screwed into one end of the sleeve 37. The sleeve 37, in turn, is slidably mounted within a conical member 39 so that the entire assembly of the sleeve 37 and its anti-friction bearings 36 may adjust itself in position within the conical member 39. The conical member 39 may be secured in position within the supporting member 12 in the same manner as described in connection with the embodiment illustrated in Fig. 1. Also the mounting of the bearings 36 upon the spindle 10 may be in every way similar to the means for mounting these members shown and described above in connection with the bearings 20.

What I claim is:

1. A spindle supporting and mounting construction comprising in combination, a supporting member, aligned conical openings therein, housing members fitting said openings, spaced anti-friction bearings within said housing members, and a sleeve slidably mounted within one of the housing members and having one of the bearing members mounted therein and a spindle supported within said bearings in said housing members whereby said spindle and the bearings within one of said conical openings are free to move axially therein.

2. A spindle supporting and mounting construction comprising in combination, a supporting member, aligned conical openings therein, housing members fitting said opening, means individually securing said housing members within said openings, spaced anti-friction bearings within said housing members, means to secure the bearings in one of said housing members against axial movement relative thereto, and a sleeve slidably mounted within the other of said housing members and having bearings retained therein, and a spindle supported within said bearings in said housing members whereby said spindle and the bearings within one of said conical openings are free to move axially therein.

In testimony whereof, I hereto affix my signature.

ALEXANDER G. WHITEHEAD.